UNITED STATES PATENT OFFICE.

EMERSON H. STRICKLER, OF NEW YORK, N. Y., ASSIGNOR TO GENERAL CHEMICAL COMPANY, OF NEW YORK, N. Y., A CORPORATION OF NEW YORK.

PROCESS OF MAKING TRI-ALKALI PHOSPHATE.

1,037,837.

Specification of Letters Patent. Patented Sept. 3, 1912.

No Drawing.

Application filed March 16, 1911. Serial No. 614,842.

*To all whom it may concern:*

Be it known that I, EMERSON H. STRICKLER, a citizen of the United States, and resident of New York city, New York, have invented certain new and useful Improvements in Processes of Making Tri-Alkali Phosphates, of which the following is a specification.

In my United States Letters Patent No. 744,128 of November 17, 1903, I disclosed a new process of making tri-sodium phosphate by treating material containing phosphoric acid such as calcium phosphate in the form of so called phosphate rock with niter cake and after removal of the calcium sulfate, suitably heating the remaining liquor with carbonaceous material such as coal.

I have now invented an improvement on said process which consists broadly in treating phosphoric acid substantially free from calcium sulfates and other sulfates, with the sulfate of an alkali such as potassium sulfate or sodium sulfate and then suitably heating that result with carbonaceous material such as coal so as to obtain tri-potassium or tri-sodium phosphate as the case may be.

This, my improved process, has the following advantages over my former process: 1. It permits the production of other tri-alkali phosphates such as potassium triphosphate as well as of sodium tri-phosphate. 2. It permits of the manufacture of greater amounts of product with the same machinery, manual help and fuel. The latter becomes evident upon the following considerations: Practice has shown that under my former process the liquor resulting from the digestion of phosphate rock with niter cake solution contains approximately 7.5% of phosphoric anhydrid ($P_2O_5$) and that this cannot be increased without making the process difficult or almost impossible as a manufacturing operation. In my new process, starting with a phosphoric acid containing 20% or thereabout of $P_2O_5$ (which is an acid of a strength commercially obtainable without evaporation by digesting phosphate rock with sulfuric acid) and adding thereto the requisite amount of say sodium sulfate, a liquor is obtained which contains by weight substantially 12.5% phosphoric anhydrid ($P_2O_5$). The mixture so resulting from 100 parts of the above phosphoric acid and amounting to 160 parts, contains approximately 80 parts of water to be driven off in the subsequent operations producing 46 parts of finished furnaced product whereas in my former process for every 46 parts of finished product 246 parts of water have to be driven off; in other words, in my new process only about ⅓ the amount of water has to be driven off as in my former process, and, from equal bulks of material to be prepared for treatment with carbonaceous material my new process enables me to produce about twice as much finished product as is produced by my former process.

In the following I give examples for the production of tri-potassium phosphate and of tri-sodium phosphate. These examples are for purposes of illustration only and my new process can be varied without departing from my invention. The parts are by weight:

*Example I.—Production of tri-sodium phosphate.*—Digest ground phosphate rock in sulfuric acid 35° Bé., and separate the undissolved calcium sulfate by filtration. To the crude phosphoric acid solution thus obtained add solid sodium sulfate, such as salt cake of good average quality, in the proportion of approximately 3 parts $Na_2SO_4$ to 1 part $P_2O_5$. Evaporate the mixture, add coal and furnace until the reaction is complete and tri-sodium phosphate is obtained. The proportions of phosphate rock and sulfuric acid must be determined empirically for each rock to get the best results. When using a high test rock and salt cake the proportions by weight are approximately 400 parts phosphate rock, 300 parts sulfuric acid 66° Bé. diluted to 35° Bé., 400 parts salt cake, 200 parts coal.

*Example II.—Production of tri-potassium phosphate.*—When making tri-potassium phosphate proceed as in Example I, but add potassium sulfate in place of salt cake. Using a 90% potassium sulfate the proportions by weight are approximately: 400 parts phosphate rock, 300 parts sulfuric acid 66° diluted to 35° Bé., 525 parts potassium sulfate, 200 parts coal.

I claim:—

1. Process of making a tri-alkali phosphate which consists in mixing phosphoric acid substantially free from sulfates with the sulfate of an alkali and carbonaceous material and furnacing the result until a tri-alkali phosphate is produced, substantially as and for the purpose described.

2. Process of making tri-sodium phosphate which consists in mixing phosphoric acid substantially free from sulfates with sulfate of sodium and carbonaceous material and furnacing the result until tri-sodium phosphate is produced, substantially as and for the purpose described.

3. The process of making a tri-alkali phosphate which consists in treating phosphate rock with sulfuric acid, removing the calcium sulfate, and furnacing the resulting product with an alkali sulfate and carbonaceous material until a tri-alkali phosphate is produced, substantially as and for the purpose described.

4. The process of making tri-sodium phosphate which consists in treating phosphate rock with sulfuric acid, removing the calcium sulfate and furnacing the so resulting product with sodium sulfate and carbonaceous material until tri-sodium phosphate is produced, substantially as and for the purpose described.

In witness whereof I have hereunto set my hand in the presence of two subscribing witnesses.

EMERSON H. STRICKLER

Witnesses:
  HOMER W. HILLYER,
  JOHN A. KEHLENBECK.